US009513710B2

(12) United States Patent  (10) Patent No.: US 9,513,710 B2
Lee et al.  (45) Date of Patent: Dec. 6, 2016

(54) MOBILE TERMINAL FOR CONTROLLING VARIOUS OPERATIONS USING A STEREOSCOPIC 3D POINTER ON A STEREOSCOPIC 3D IMAGE AND CONTROL METHOD THEREOF

(75) Inventors: Jinsool Lee, Seoul (KR); Dongok Kim, Seoul (KR); Taeyun Kim, Seoul (KR); Seungmin Seen, Seoul (KR)

(73) Assignee: LG Electronics Inc., Seoul (KR)

( * ) Notice: Subject to any disclaimer, the term of this patent is extended or adjusted under 35 U.S.C. 154(b) by 1127 days.

(21) Appl. No.: 13/223,880

(22) Filed: Sep. 1, 2011

(65) Prior Publication Data

US 2012/0062558 A1   Mar. 15, 2012

(30) Foreign Application Priority Data

Sep. 15, 2010  (KR) .................. 10-2010-0090761

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/011* (2013.01); *G06F 3/0304* (2013.01); *G06F 3/04812* (2013.01); *G06F 3/04815* (2013.01)

(58) Field of Classification Search
CPC ...... G06F 3/017; G06F 3/0346; G06F 3/0304; G06F 2203/04806; G06F 3/0482; G06K 9/00355; G06T 2207/30196; G03H 1/268
(Continued)

(56) References Cited

U.S. PATENT DOCUMENTS 4,808,979 A * 2/1989 DeHoff et al. ................. 715/856
5,162,779 A * 11/1992 Lumelsky ........... G06F 3/04812
345/157
(Continued)

FOREIGN PATENT DOCUMENTS

CN    1183151 A    5/1998
CN  101308441 A   11/2008
(Continued)

OTHER PUBLICATIONS

Liu et al., "Stereoscopic Pointer", IBM Technical Disclosure Bulletin, v. 37, n. 5, pp. 571-572, May 1994.*
(Continued)

*Primary Examiner* — Jennifer To
*Assistant Examiner* — Joseph R Burwell
(74) *Attorney, Agent, or Firm* — KED & Associates LLP

(57) ABSTRACT

A mobile terminal and a method for controlling the operation of the mobile terminal are provided. In the method, a stereoscopic 3D image that utilizes binocular disparity between a left-eye image and a right-eye image is displayed on a display and a stereoscopic 3D pointer is displayed in the stereoscopic 3D image when a user's hand is detected according to analysis of visual data acquired by a camera. The position of the stereoscopic 3D pointer is moved according to movement of the hand when the movement of the hand is detected according to analysis of the visual data. According to this method, the operation of the mobile terminal can be controlled by the user's hand movement or gesture.

25 Claims, 13 Drawing Sheets

(51) Int. Cl.
*G06F 3/03* (2006.01)
*G06F 3/0481* (2013.01)

(58) Field of Classification Search
USPC .......................................................... 715/700
See application file for complete search history.

(56) References Cited

U.S. PATENT DOCUMENTS

| | | | | |
|---|---|---|---|---|
| 6,144,366 | A * | 11/2000 | Numazaki et al. | 345/156 |
| 6,191,773 | B1 * | 2/2001 | Maruno et al. | 345/158 |
| 6,204,852 | B1 * | 3/2001 | Kumar et al. | 715/863 |
| 6,215,890 | B1 * | 4/2001 | Matsuo et al. | 382/103 |
| 6,243,054 | B1 | 6/2001 | DeLuca | |
| 6,559,813 | B1 | 5/2003 | DeLuca | |
| 6,624,833 | B1 * | 9/2003 | Kumar et al. | 715/863 |
| 8,018,579 | B1 * | 9/2011 | Krah | 356/4.01 |
| 2005/0166163 | A1 * | 7/2005 | Chang et al. | 715/863 |
| 2007/0243863 | A1 * | 10/2007 | Hong | G02B 27/017 455/418 |
| 2008/0170776 | A1 * | 7/2008 | Albertson et al. | 382/154 |
| 2008/0225007 | A1 * | 9/2008 | Nakadaira et al. | 345/173 |
| 2009/0077504 | A1 * | 3/2009 | Bell et al. | 715/863 |
| 2009/0168027 | A1 * | 7/2009 | Dunn et al. | 353/28 |
| 2009/0217209 | A1 * | 8/2009 | Chen | G06T 19/00 715/856 |
| 2009/0315740 | A1 | 12/2009 | Hildreth et al. | |
| 2010/0053151 | A1 * | 3/2010 | Marti et al. | 345/419 |
| 2010/0277489 | A1 * | 11/2010 | Geisner et al. | 345/581 |
| 2011/0050562 | A1 * | 3/2011 | Schoen et al. | 715/850 |
| 2011/0107216 | A1 * | 5/2011 | Bi | 715/716 |
| 2011/0109617 | A1 * | 5/2011 | Snook et al. | 345/419 |
| 2011/0141009 | A1 * | 6/2011 | Izumi | 345/156 |
| 2011/0234543 | A1 * | 9/2011 | Gardenfors et al. | 345/175 |
| 2011/0289455 | A1 * | 11/2011 | Reville et al. | 715/830 |
| 2011/0310007 | A1 * | 12/2011 | Margolis et al. | 345/157 |
| 2011/0320983 | A1 * | 12/2011 | Chen et al. | 715/836 |
| 2012/0056982 | A1 * | 3/2012 | Katz et al. | 348/43 |
| 2012/0069159 | A1 * | 3/2012 | Matsui et al. | 348/51 |
| 2012/0155705 | A1 * | 6/2012 | Latta et al. | 345/156 |

FOREIGN PATENT DOCUMENTS

| | | |
|---|---|---|
| CN | 101587386 A | 11/2009 |
| EP | 0 837 418 A2 | 4/1998 |
| WO | WO 2009/035705 A1 | 3/2009 |

OTHER PUBLICATIONS

European Search Report issued in application No. 11007193.3 dated Nov. 19, 2014.
Chinese Office Action issued in application No. 201110279323.5 dated Dec. 22, 2014.
"Multimedia Technology Base", He Qi Jing etc., Chemistry Industry Publisher, 150pg., p. 1-3, published Aug. 31, 2005.

* cited by examiner (a)　　　　　　　　(b)　　　　　　　　(c)

(a)          (b)          (c)

(a)          (b)          (c)

MOBILE TERMINAL FOR CONTROLLING VARIOUS OPERATIONS USING A STEREOSCOPIC 3D POINTER ON A STEREOSCOPIC 3D IMAGE AND CONTROL METHOD THEREOF

CROSS-REFERENCE TO RELATED APPLICATION(S)

This application claims the priority benefit of Korean Patent Application No. 10-2010-0090761, filed on Sep. 15, 2010 in the Korean Intellectual Property Office, the disclosure of which is incorporated herein by reference.

BACKGROUND

1. Field

The present invention relates to a mobile terminal and a method for controlling the operation of the mobile terminal, wherein it is possible to control operations of the mobile terminal using a stereoscopic 3D pointer in a stereoscopic 3D image displayed on the mobile terminal.

2. Background

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various novel attempts have been made in terms of hardware or software to provide more complex functionality to the mobile terminal implemented as such a multimedia player. One example is a user interface environment that enables the user to easily and conveniently search for and select a function.

A technology in which a number of images captured through cameras are combined through image processing to generate a stereoscopic 3D image has also been used recently. When this technology is applied to a mobile terminal, it is possible to generate a stereoscopic 3D image using cameras provided on the mobile terminal and to display a stereoscopic 3D image on a display of the mobile terminal.

However, when a stereoscopic 3D menu screen is implemented, it is difficult to select and activate a specific icon in the stereoscopic 3D menu screen due to the binocular disparity and apparent depth of the icon, although it is possible to arrange icons or the like in different layers at different depths in the stereoscopic 3D image.

Thus, there is a need to consider a method for controlling the operation of the mobile terminal using a stereoscopic 3D pointer, which enables the user to conveniently select a specific object and to activate a corresponding function through intuitive manipulation in a 3D space.

SUMMARY OF THE INVENTION

The present invention provides a mobile terminal and a method for controlling the operation of the mobile terminal, wherein it is possible to control the operation of the mobile terminal using a stereoscopic 3D pointer, which can be manipulated by the user's hand movement or gesture, in a stereoscopic 3D image.

According to an aspect of the present invention, there is provided a method for controlling operation of a mobile terminal, the method including displaying a stereoscopic 3D image on a display, the stereoscopic 3D image utilizing binocular disparity between a left-eye image and a right-eye image, displaying a stereoscopic 3D pointer in the stereoscopic 3D image when a user's hand is detected according to analysis of visual data acquired by a camera, and moving a position of the stereoscopic 3D pointer according to movement of the hand when the movement of the hand is detected according to analysis of the visual data.

According to another aspect of the present invention, there is provided a mobile terminal including a display module configured to display a stereoscopic 3D image utilizing binocular disparity between a left-eye image and a right-eye image and a controller configured to display a stereoscopic 3D pointer in the stereoscopic 3D image when a user's hand is detected according to analysis of visual data acquired by a camera and to move a position of the stereoscopic 3D pointer according to movement of the hand when the movement of the hand is detected according to analysis of the visual data.

BRIEF DESCRIPTION OF THE DRAWINGS

The embodiments will be described in detail with reference to the following drawings in which like reference numerals refer to like elements wherein.

DETAILED DESCRIPTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, an electronic-book (e-book) reader, and the like. In this disclosure, the terms 'module' and 'unit' can be used interchangeably.

Figure 1:
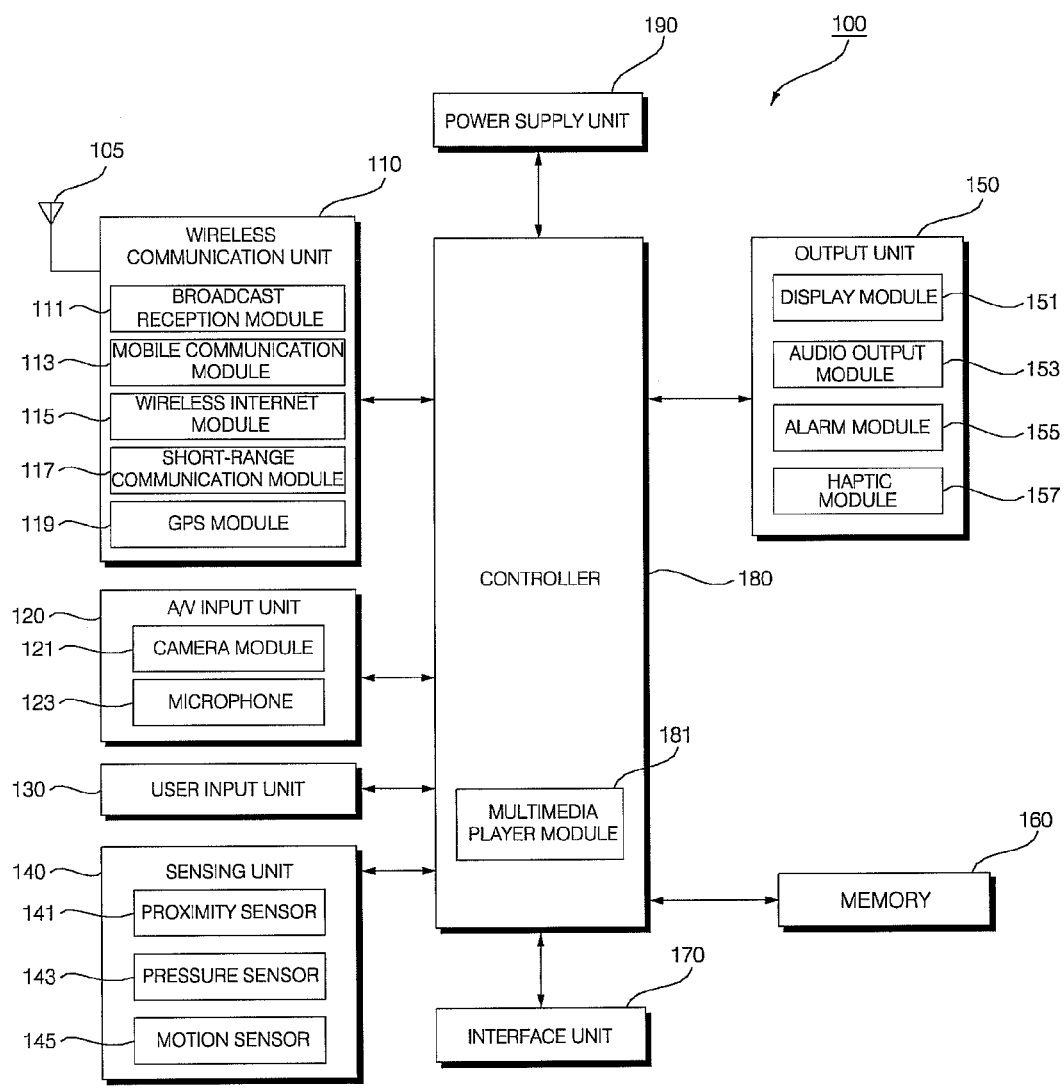
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may come in the form of digital multimedia broadcasting (DMB) electronic program guide (EPG) or digital video broadcasting-handheld (DVB-H) electronic service guide (ESG).

The broadcast reception module 111 may receive broadcast signals using various broadcasting systems, such as DMB-terrestrial (DMB-T), DMB-satellite (DMB-S), media forward link only (MediaFLO), DVB-H, and integrated services digital broadcast-terrestrial (ISDB-T). In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the position of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may detect an approaching object or whether there is an object nearby the mobile terminal 100 without mechanical contact. More specifically, the detection sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

Generally, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of an LCD, a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. Various embodiments presented herein can be implemented using nearly any type of mobile terminal, such as a folder-type, a bar-type, a swing-type and a slider-type mobile terminal. However, for convenience, it is assumed that the mobile terminal 100 is a bar-type mobile terminal equipped with a touch screen.

Figure 2:
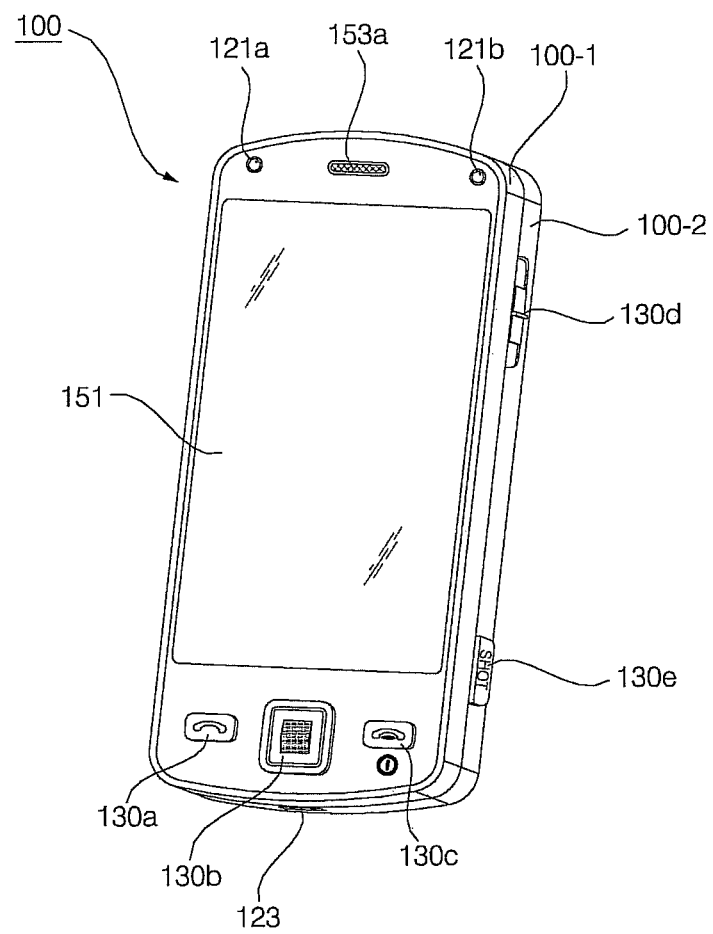
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153a, a first camera 121a, and first through third user input modules 130a through 130c may be disposed in the main body of the mobile terminal 100, and particularly, in the front case 100-1. Fourth and fifth user input modules 130d and 130e and the microphone 123 may be disposed on one side of the rear case 100-2.

If a touch pad is configured to overlap the display module 151 and thus to form a mutual layer structure, the display module 151 may serve as a touch screen. Thus, the user can enter various information simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through fifth user input modules 130a through 130e and sixth and seventh user input modules 130f and 130g may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first through third user input modules 130a through 130c may be used to make or receive a call, move a mouse pointer, scroll a display screen, and enter various commands such as 'start', 'end', and 'scroll' to the mobile terminal 100, the fourth user input module 130d may be used to select an operating mode for the mobile terminal 100, and the fifth user input module 130e may serve as a hot key for activating certain functions of the mobile terminal 100.

The first user input module 130a may allow the user to, the second user input module 130b may be used to enter various numerals, characters or symbols, and the third and fourth user input modules 130c and 130d may be used as hot keys for activating certain functions of the mobile terminal 100.

Figure 3:
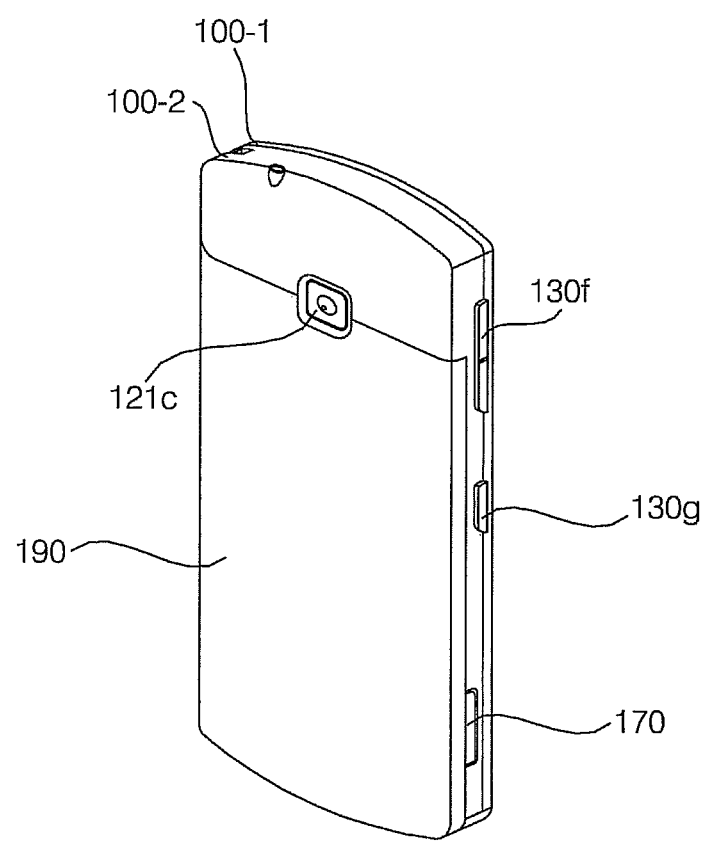
FIG. 3 illustrates a rear perspective view of the mobile terminal shown in FIG. 2.

FIG. 3 illustrates a rear perspective view of the mobile terminal 100. Referring to FIG. 3, a second camera 121b may be disposed at the rear of the rear case 100-2. The sixth and seventh user input modules 130f and 130e and the interface unit 170 may be disposed on one side of the second body 100B.

The second camera 121b may have a different photographing direction from the first camera 121a shown in FIG. 2. In addition, the first and second cameras 121a and 121b may have different resolutions.

A camera flash and a mirror may be disposed near the second camera 121*b*. The camera flash may be used to illuminate a subject when the user attempts to capture an image of the subject with the second camera 121*b*. The mirror may be used for the user to prepare himself or herself for taking a self shot.

A second audio output module (not shown) may be additionally provided in the rear case 100-2. The second audio output module may realize a stereo function along with the first audio output module 153*a*. The second audio output module may also be used in a speaker-phone mode.

The interface unit 170 may serve as a pathway for allowing the mobile terminal 100 to exchange data with an external device.

Not only an antenna (not shown) for making or receiving a call but also an antenna (not shown) for receiving a broadcast signal may be disposed on one side of the rear case 100-2. The antennas may be installed so as to be able to be retracted from the rear case 100-2.

The power supply unit 190, which supplies power to the mobile terminal 100, may be disposed in the rear case 100-2. The power supply unit may be a rechargeable battery and may be coupled to the rear case 100-2 so as to be attachable to or detachable from the rear case 100-2.

The second camera 121*b* and the other elements that have been described as being provided in the rear case 100-2 may be provided in the front case 100-1. In addition, the first camera 121*a* may be configured to be rotatable and thus to cover the photographing direction of the second camera 121*b*. In this case, the second camera 121*b* may be optional.

In a method for controlling the operation of a mobile terminal according to the present invention, a proximity object such as the user's hand may be identified using a camera provided on the mobile terminal and a stereoscopic 3D pointer may be operated in a stereoscopic 3D image in association with the identified proximity object to select a specific object displayed in the stereoscopic 3D image or to perform a specific function.

The term "3D stereoscopic image" refers to an image which is perceived by the user when displayed on a monitor or screen such that each object present in the image appears to provide the same depth and reality perception as any normal object in the real space. A stereoscopic 3D image provides different 2D images to each eye. The two 2D images are then transmitted to the brain via the retina. The brain then combines the two images so as to provide depth and reality perception. Stereoscopic sensation is produced by binocular disparity due to the distance of about 65 mm between human eyes. Binocular disparity is the most important factor required for all stereoscopic displays to produce 3D imaginary.

Methods for displaying a stereoscopic 3D image include a stereoscopic method utilizing glasses, an auto-stereoscopic method that does not require the use of glasses, and a projection method utilizing holographic technology. The stereoscopic method is widely used for household TVs and auto-stereoscopy is generally used for mobile terminals.

Methods that do not require the use of glasses include a lenticular method, a parallax barrier method, and a parallax illumination method. In the lenticular method, a semi-cylindrical lenticular sheet corresponding to the interval between left-eye and right-eye images is attached to the front of an element on which the left-eye and right-eye images are displayed such that the left-eye image is viewed only by the left eye and the right-eye image is viewed only by the right eye, thereby providing stereoscopic sensation. In the parallax barrier method, left-eye and right-eye images are displayed below a parallax barrier such that different images are viewed by the left and right eyes, thereby providing stereoscopic sensation. In the parallax illumination method, an illumination line is provided at the rear side of an LCD configured such that different LCD lines of illuminated light are provided to the left and right eyes, thereby providing a stereoscopic effect. In addition, studies have been conducted on methods for implementing 3D display based on other factors providing stereoscopic perception to the human.

In this disclosure, the terms 'stereoscopic 3D image' and '3D image' can be used interchangeably. In addition, the terms 'stereoscopic 3D pointer' and '3D pointer' can be used interchangeably.

Figure 4A:
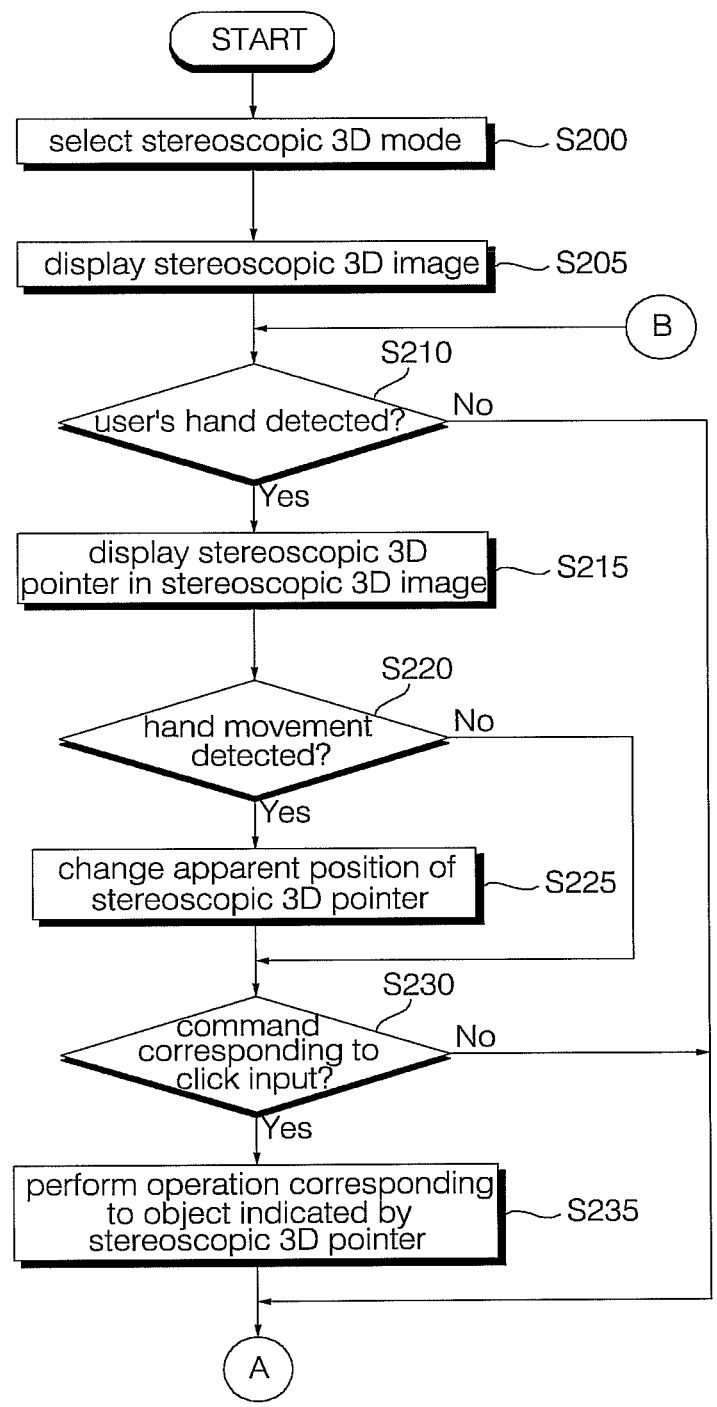
FIGS. 4A and 4B are flow charts illustrating a method for controlling the operation of a mobile terminal according to an embodiment of the present invention.
Figure 4B:
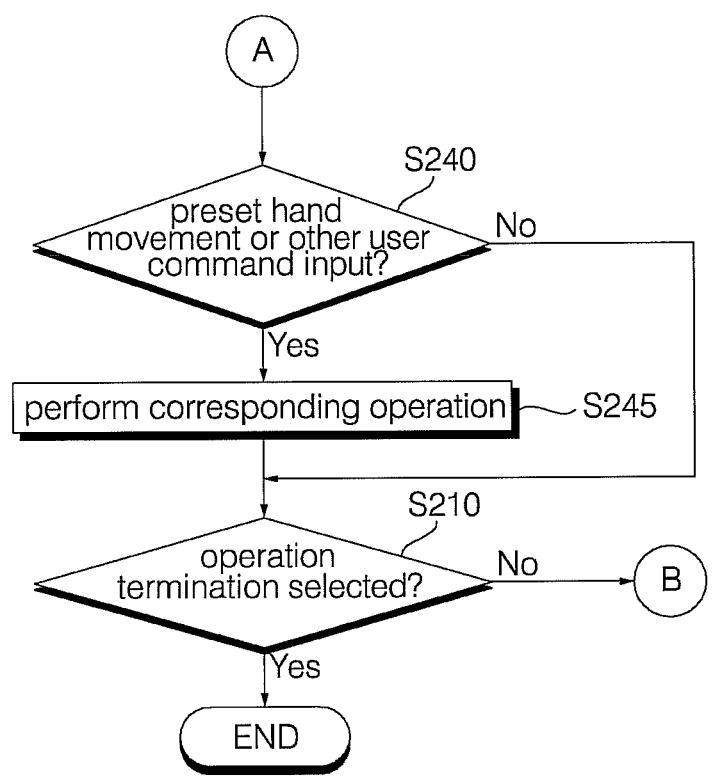

FIGS. 4A and 4B are flow charts illustrating a method for controlling the operation of a mobile terminal according to an embodiment of the present invention. As shown in FIG. 4A, when a stereoscopic 3D mode for displaying a stereoscopic 3D image is selected according to a user command or the like (S200), the controller 180 displays a stereoscopic 3D image, which utilizes binocular disparity between left-eye and right-eye images, on the display module 151 (S205).

When the user's hand is sensed through analysis of visual data acquired through the camera 121 while the stereoscopic 3D image is being displayed (S210), the controller 180 displays a stereoscopic 3D pointer in the stereoscopic 3D image (S215).

Here, the stereoscopic 3D pointer may be displayed in the form of, for example, the user's hand or finger acquired by the camera 121 and may also be displayed in the form of an arrow or a shape set by the user. The color, transparency, and the like of the stereoscopic 3D pointer may also be set by the user.

When movement of the user's hand is sensed through analysis of visual data acquired through the camera 121 (S220), the controller 180 performs a control operation for moving (i.e., changing) the apparent position of the stereoscopic 3D pointer in the stereoscopic 3D image according to movement of the user's hand (S225).

For example, when the user moves their hand in the vertical direction (upward or downward) or in the horizontal direction (to the left or to the right) while maintaining the same distance from the camera 121 (or from the front surface of the mobile terminal), the stereoscopic 3D pointer is displayed such that the stereoscopic 3D pointer appears to move vertically or horizontally without any change in apparent depth. When the user moves their hand in a direction towards or away from the camera 121, the stereoscopic 3D pointer is displayed such that the apparent depth of the stereoscopic 3D pointer changes accordingly. When the stereoscopic 3D pointer is moved, a corresponding indicator may be displayed to indicate the current apparent position of the stereoscopic 3D pointer.

When the user makes a preset input to enter a command corresponding to click (S230), the controller 180 controls the mobile terminal to perform a preset operation corresponding to an object indicated by the pointer (S235). Examples of the object indicated by the pointer include a hyperlink, a soft key, and a menu icon. An object indicated or selected by the pointer may be displayed in the stereoscopic 3D image in a different color or form than other objects.

A preset hand gesture input or the like may be used to enter the command corresponding to click. For example, the user can perform an operation corresponding to a mouse click through a hand gesture of extending and retracting their index finger twice or through a hand gesture of making a fist.

Depending on the operation mode, the mobile terminal may also be configured so as to perform an operation corresponding to an object indicated by the stereoscopic 3D pointer when the stereoscopic 3D pointer is not in motion for a predetermined time. That is, the controller 180 may perform an operation corresponding to a mouse click when a predetermined activation time has passed. The activation time may be set according to user preference.

As shown in FIG. 4B, when a hand movement or user input preset to perform a function other than the function to input a command corresponding to click and the function to move the stereoscopic 3D pointer has been made (S240), the controller 180 controls the mobile terminal to perform a corresponding operation (S245). For example, the mobile terminal may be configured so as to perform a drag input operation when the hand is moved with the fingers splayed out. The controller 180 may perform an operation for selecting an object indicated by the stereoscopic 3D pointer when the user's index finger is folded and straightened once and may perform an operation corresponding to a mouse right-click when the user's middle finger is folded and straightened once.

This procedure is repeated until operation termination is selected (S250). This procedure allows the user to intuitively perform a desired control operation in the stereoscopic 3D image through movement of the hand.

Figure 5:
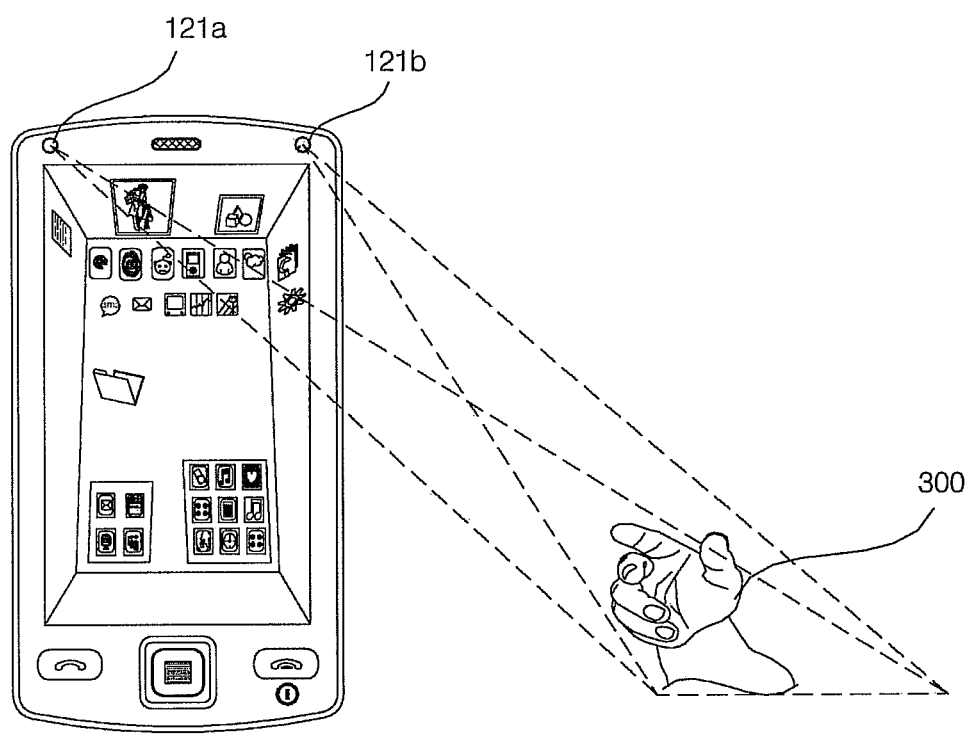
FIGS. 5 and 6 illustrate a procedure for detecting the user's hand according to an embodiment of the present invention.
Figure 6:
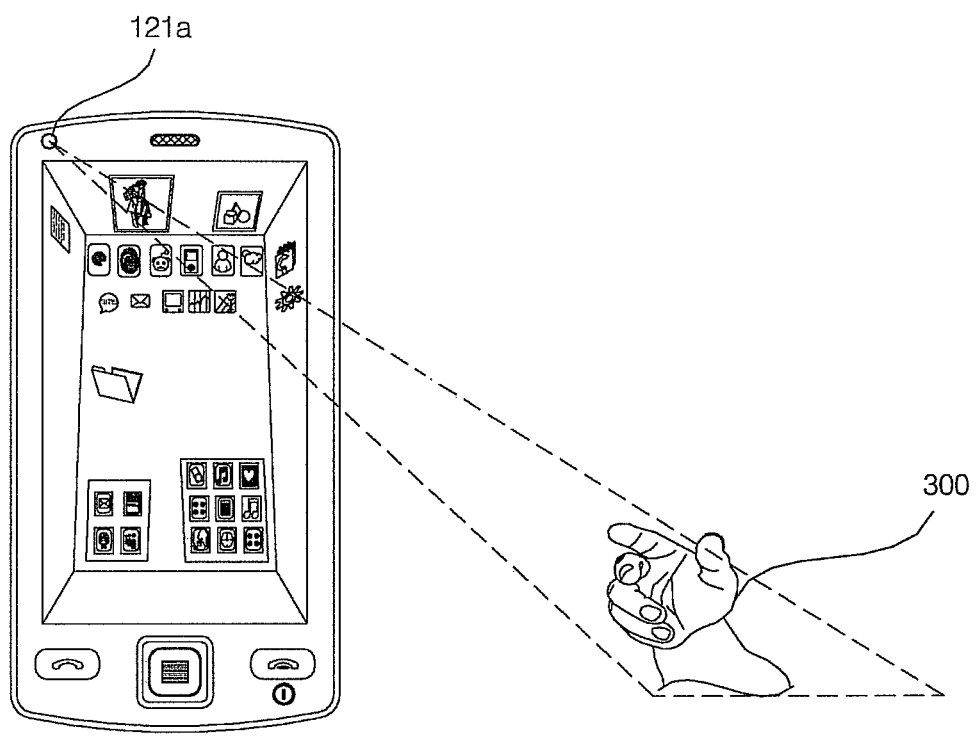

FIGS. 5 to 13 illustrate a method for controlling the operation of a mobile terminal according to the present invention. First, FIGS. 5 and 6 illustrate a procedure for detecting the user's hand.

As shown in FIG. 5, the user's hand 300 may be detected using first and second cameras 121a and 121b provided on the front case 100-1. The user's hand 300 may be detected through analysis of visual data acquired through one of the first and second cameras 121a and 121b. Whether or not the user's hand 300 has moved and whether the user's hand 300 is moving towards or away from the first and second cameras 121a and 121b may be determined through changes in the focal distance of images of the hand acquired through the first and second cameras 121a and 121b or through changes of the position and size of the image. Changes of the user's hand gesture such as retracting or extending of a specific finger may also be determined through the acquired images.

As shown in FIG. 6, the user's hand 300 may be detected or the user's hand movement or hand gesture may be detected using only the first camera 121a rather than using both the first and second cameras 121a and 121b. That is, the user's hand movement or gesture may be detected by a mobile terminal having only one camera.

When both the first and second cameras 121a and 121b are used, a stereoscopic 3D image corresponding to the stereoscopic 3D pointer may be generated in real time utilizing binocular disparity between images acquired through the first and second cameras 121a and 121b. On the other hand, when only one camera is used, a preset stereoscopic 3D image corresponding to an acquired image may be used or a procedure for generating a stereoscopic 3D image corresponding to an image acquired through the camera may be performed.

A third camera 121c provided at the rear surface of the mobile terminal may be used to detect the user's hand movement or hand gesture and a camera provided near the third camera 121c may also be used to capture a stereoscopic 3D image.

Figure 7:
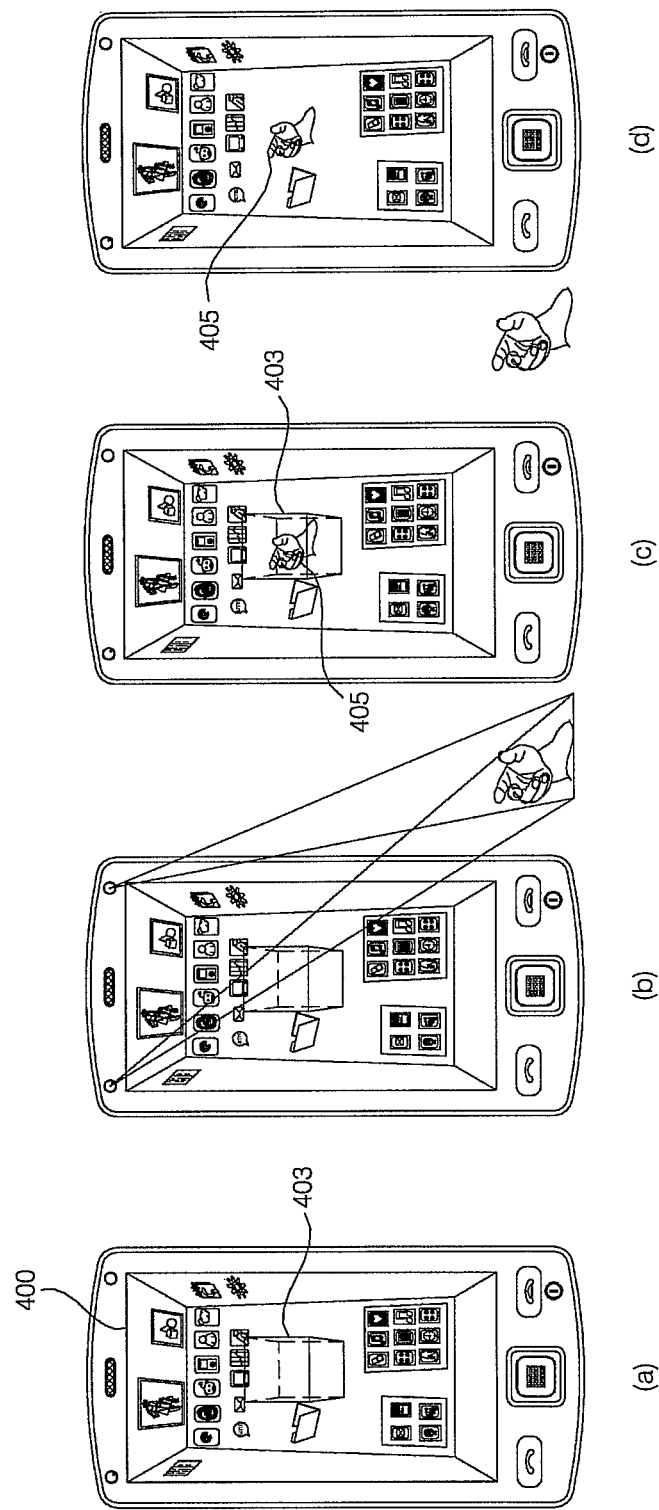
FIG. 7 illustrates a procedure for initial setting of a stereoscopic 3D pointer according to an embodiment of the present invention.

FIG. 7 illustrates a procedure for initial setting of a stereoscopic 3D pointer in a stereoscopic 3D image. As shown in FIG. 7(a), a box 403 or a different type of guide may be displayed in a stereoscopic 3D image 400 to initially set the size of the stereoscopic 3D pointer.

Then, images may be acquired through the first and second cameras 121a and 121b as shown in FIG. 7(b) and a stereoscopic 3D pointer 405 in the shape of a hand generated through the acquired images may be displayed in the box 403 as shown in FIG. 7(c). Here, a procedure for the user to move their hand such that the stereoscopic 3D pointer 405 in the shape of a hand enters the box 403 may be added to modify the apparent position indicated by the stereoscopic 3D pointer in the stereoscopic 3D image according to the user's hand movement.

After the user's hand movement causing the stereoscopic 3D pointer 405 to enter the box 403 is completed, the apparent position of the stereoscopic 3D pointer may also be moved according to the user's hand movement as shown in FIG. 7(d).

An icon that is located in a path along which the stereoscopic 3D pointer 405 moves may be displayed such that the stereoscopic 3D pointer 403 passes through the icon or may be displayed such that the icon shifts out of the way of the stereoscopic 3D pointer 405. In addition, a transparency adjustment menu or a pointer shape setting menu may be provided to set the transparency or shape of the stereoscopic 3D pointer 405 as desired by the user.

Figure 8:
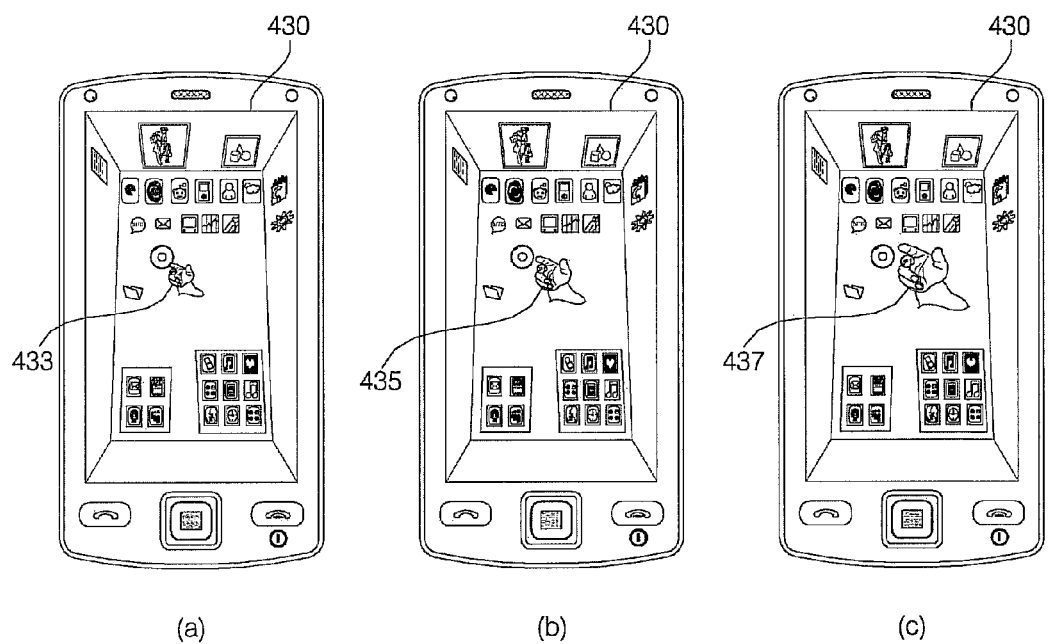
FIGS. 8 and 9 illustrate a procedure in which the depth of a stereoscopic 3D pointer is changed according to an embodiment of the present invention.
Figure 9:
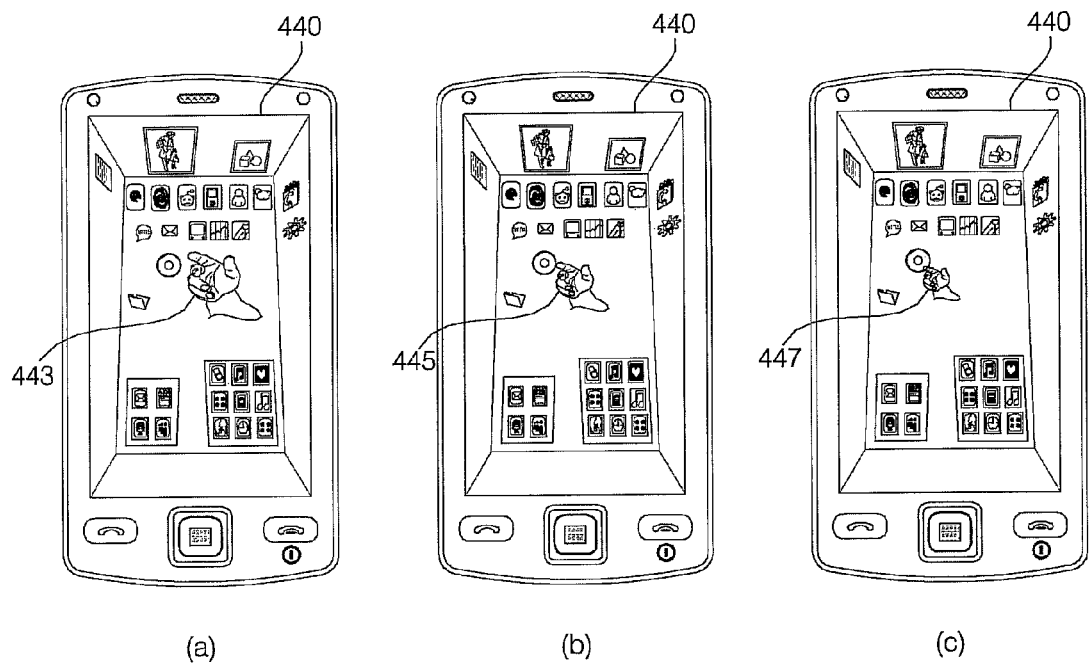

FIGS. 8 and 9 illustrate a procedure in which the depth of a stereoscopic 3D pointer is changed. As shown in FIGS. 8(a) to (c), as the user's hand moves away from the first and second cameras 121a and 121b, the depth of a stereoscopic 3D pointer 433, 435, 437 gradually decreases so that an icon or the like arranged in a layer at a shallow depth can be selected using the stereoscopic 3D pointer 437.

On the other hand, as shown in FIGS. 9(a) to 9(c), as the user's hand approaches the first and second cameras 121a and 121b, the depth of a stereoscopic 3D pointer 443, 445, 447 gradually increases so that an icon or the like arranged in a layer at a great depth can be selected using the stereoscopic 3D pointer 447.

Also when the stereoscopic 3D pointer is moved depthwise, an icon that is located in a path along which the stereoscopic 3D pointer moves may be displayed such that the icon shifts out of the way of the stereoscopic 3D pointer.

Figure 10:
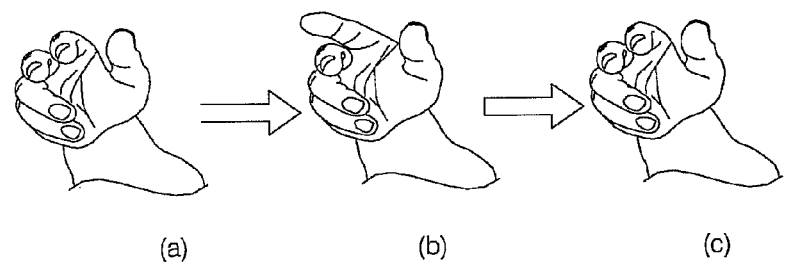
FIG. 10 illustrates an exemplary hand gesture.

FIG. 10 illustrates an exemplary hand gesture. An operation corresponding to a mouse click may be performed by a hand gesture input as shown in FIG. 10. That is, the user may cause the mobile terminal to perform an operation for selecting an object indicated by a stereoscopic 3D pointer by making a gesture of extending and retracting their index finger.

The user may also cause the mobile terminal to perform an operation corresponding to a mouse left click by retracting and extending the index finger twice and may also perform an operation corresponding to a mouse right click by retracting and extending the middle finger once. The user may also cause the mobile terminal to perform an operation for displaying a next screen by retracting and extending the ring finger once, an operation for closing the current window by extending and retracting all fingers, an operation for displaying only icons that are located in a layer at the same depth as the current depth of the stereoscopic 3D pointer by extending and retracting three fingers, and an operation for moving the stereoscopic 3D pointer up or down one layer.

In this manner, hand gestures may be associated with specific functions to allow the mobile terminal to perform a variety of operations according to hand gestures. To accomplish this, an additional menu may be provided to perform setting of functions corresponding to specific hand gestures.

Figure 11:
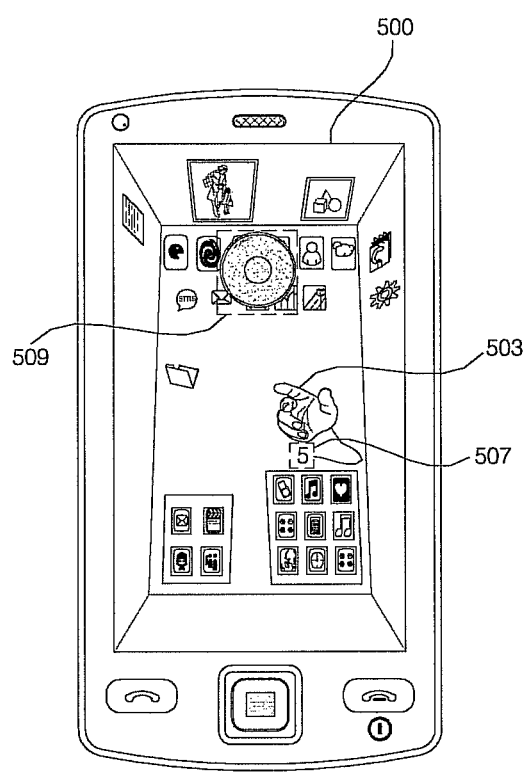
FIGS. 11 to 13 illustrate a procedure for displaying depth information corresponding to the depth of a stereoscopic 3D pointer according to an embodiment of the present invention.
Figure 12:
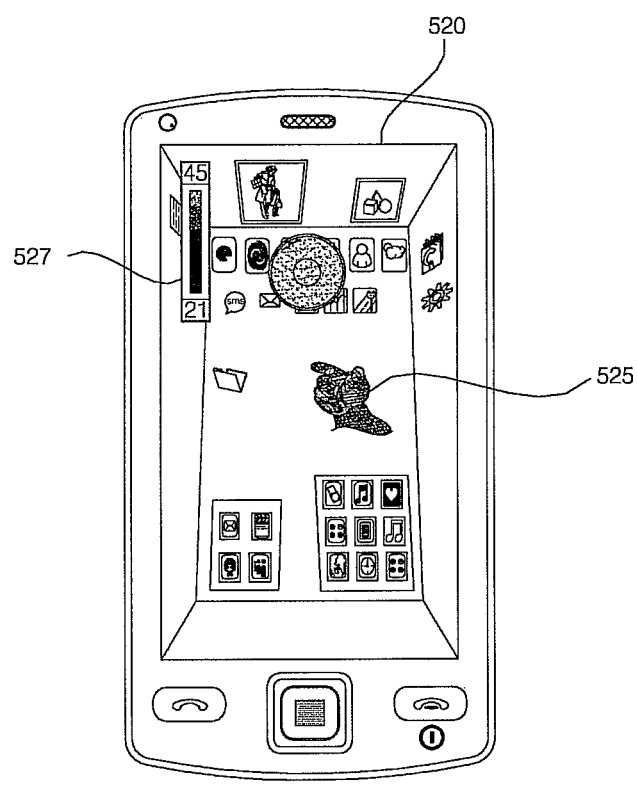
Figure 13:
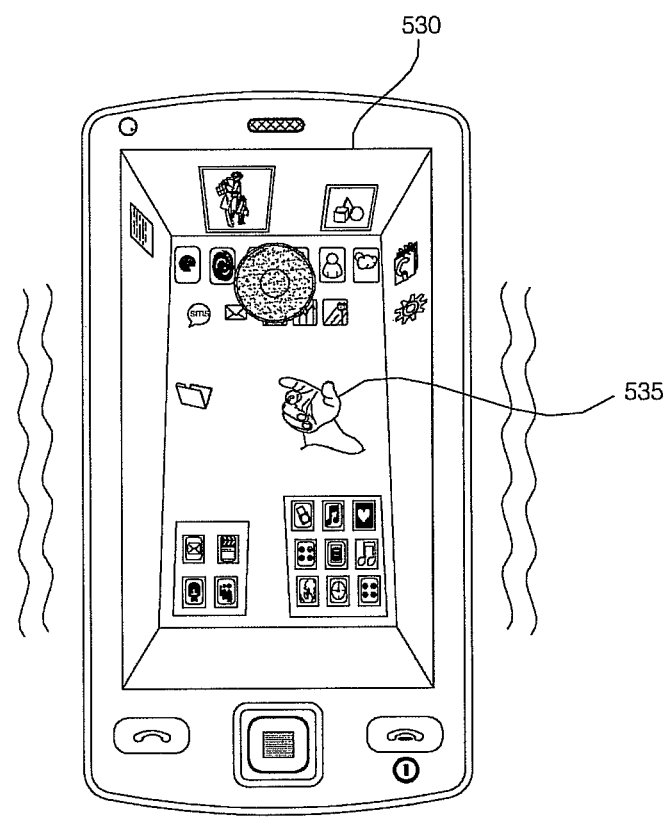

FIGS. 11 to 13 illustrate a procedure for displaying depth information corresponding to the depth of a stereoscopic 3D pointer.

As shown in FIG. 11, depth information corresponding to the current depth of a stereoscopic 3D pointer 503 may be displayed as a number 507 when the stereoscopic 3D pointer 503 moves in a stereoscopic 3D image screen 500. Here, an icon 509 located in the same layer as the stereoscopic 3D pointer 503 may be displayed with a different color than other icons or may be displayed with a different background color than other icons. Screen effects such as shadow effects may be applied to the icon 509 located in the same layer as the stereoscopic 3D pointer 503 so that the icon 509 can be easily discriminated from icons located at other layers. This allows the user to easily identify an icon located in the same layer as the stereoscopic 3D pointer.

Also, the stereoscopic 3D pointer may have visual effects when the stereoscopic 3D pointer 503 is closer to a specific icon. The icon may be an icon preset by a user. The color or shape of the stereoscopic 3D pointer 503 may be changed and the stereoscopic 3D pointer may glitter or blink when the stereoscopic 3D pointer 503 is closer to the specific icon. This allows the user to easily identify the specific icon preset by user.

An icon approached or selected by the stereoscopic 3D pointer 503 may also be displayed such that the icon can be easily discriminated from other icons. The depth information of the stereoscopic 3D pointer 503 may be displayed only when the stereoscopic 3D pointer 503 moves while the depth information is not displayed normally.

FIG. 12 illustrates a stereoscopic 3D image 520 on which depth information 527 is displayed in the shape of a bar graph (or a level indicator) to indicate the current depth of a stereoscopic 3D pointer 525. As shown in FIG. 12, the depth information of the stereoscopic 3D pointer 525 may be displayed in various ways other than numeric form. The color or shape of the stereoscopic 3D pointer 525 may be changed when the stereoscopic 3D pointer 525 moves to a specific layer set by the user.

As shown in FIG. 13, a stereoscopic 3D image screen 530 may be divided into several layers located at different depths and icons or the like may be arranged at each layer, and a feedback signal such as vibration generated by the haptic module 157 may then be output each time a stereoscopic 3D pointer 535 reaches a new layer. This feedback signal allows the user to identify a layer, at which the stereoscopic 3D pointer 535 is currently located, through tactile sensation.

Other examples of the method of providing (sensory) feedback to change of the depth of the stereoscopic 3D pointer include a method of applying shadow effects to the stereoscopic 3D pointer, a method of displaying 3D coordinates of the stereoscopic 3D pointer, and a method of changing the color of the stereoscopic 3D pointer.

The mobile terminal and the method for controlling the operation of the same according to the present invention are not limited in application to the configurations and methods of the embodiments described above and all or some of the embodiments may be selectively combined to implement various modifications.

The method for controlling the operation of a mobile terminal according to the present invention can be embodied as processor readable code stored on a processor readable medium provided in the mobile terminal. The processor readable medium includes any type of storage device that stores data which can be read by a processor. Examples of the processor readable medium include Read-Only Memory (ROM), Random-Access Memory (RAM), CD-ROMs, magnetic tapes, floppy disks, optical data storage devices, and so on. The processor readable medium can also be embodied in the form of carrier waves such as signals transmitted over the Internet. The processor readable medium can also be distributed over a network of coupled processor systems so that the processor readable code is stored and executed in a distributed fashion.

As is apparent from the above description, the present invention has a variety of advantages. For example, a stereoscopic 3D pointer is displayed in a stereoscopic 3D image such that it is possible to perform a specific function or to move the stereoscopic 3D pointer according to the user's hand movement or gesture. Accordingly, the user can conveniently control various operations of the mobile terminal through intuitive manipulation when a stereoscopic 3D image is displayed on the mobile terminal.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method of a mobile terminal, the method comprising:
displaying a perceived three dimensional (3D) image on a display;
receiving first visual data of an indicator from at least one camera;
displaying a 3D pointer in the displayed 3D image based on the received first visual data of the indicator;
receiving second visual data of the indicator from the at least one camera;
changing a position of the displayed 3D pointer on the display based on the received second visual data;
displaying depth information corresponding to a depth of the 3D pointer in the 3D image while the 3D pointer is moved, and not displaying the depth information in the 3D image while the 3D pointer is stopped;
outputting a vibration pattern corresponding to a new layer each time the 3D pointer reaches the new layer; and
performing an operation associated with an object indicated by the 3D pointer, wherein the performing of the operation includes performing the operation in response to a predetermined gesture when the mobile terminal is a first operation mode, and performing the operation in response to a determination that the indicator has not moved for a predetermined time when the mobile terminal is a second operation mode,
wherein the 3D image is divided into a plurality of layers located at different depths and one or more icons are arranged at each layer, and
wherein an icon located in the same layer as the 3D pointer is displayed with a different color or shape than other icons located at other layers such that a user of the mobile terminal can easily identify the icon located in the same layer as the 3D pointer.

2. The method of claim 1, wherein the indicator is a hand.

3. The method of claim 1, wherein changing the position of the displayed 3D pointer includes changing the position of the displayed 3D pointer based on movement of the indicator.

4. The method of claim 1, further comprising:
detecting a gesture based on visual data received from the camera, wherein performing the operation associated with the object indicated by the 3D pointer includes performing the operation based on the detected gesture.

5. The method of claim 1, further comprising changing a 3D depth of the displayed 3D pointer based on movement of the indicator.

6. The method of claim 1, wherein the determination that the indicator has not moved for the predetermined time is based on visual data received from the camera.

7. The method of claim 1, further comprising outputting a feedback signal in response to a change of a depth of the 3D pointer.

8. The method of claim 1, further comprising displaying a menu for setting a function corresponding to a specific gesture of the indicator.

9. The method of claim 1, wherein the color or shape of the 3D pointer is changed when the 3D pointer moves to a specific layer set by a user based on the received second visual data without further interaction of the indicator.

10. The method of claim 1, further comprising:
displaying a guide icon for initially setting a size of the 3D pointer on the 3D image, and
in response to a movement of the indicator, moving the 3D pointer into the guide icon.

11. The method of claim 1, further comprising:
providing a menu for adjusting a transparency of the 3D pointer.

12. The method of claim 1, wherein the depth information is displayed as a number or a bar graph.

13. A mobile terminal comprising:
a display configured to display a three-dimensional (3D) image;
at least one camera configured to acquire visual data; and
a controller configured to:
receive, from the camera, first visual data of an indicator,
display a 3D pointer in the 3D image based on the received first visual data of the indicator,
receive second visual data of the indicator from the camera,
change a position of the displayed 3D pointer based on the received second visual data,
display depth information corresponding to a depth of the 3D pointer in the 3D image while the 3D pointer is moved, and not display the depth information in the 3D image while the 3D pointer is stopped,
output a vibration pattern corresponding to a new layer each time the 3D pointer reaches the new layer, and
perform an operation associated with an object indicated by the 3D pointer,
wherein the 3D image is divided into a plurality of layers located at different depths and one or more icons are arranged at each layer,
wherein an icon located in the same layer as the 3D pointer is displayed with a different color or shape than other icons located at other layers such that a user of the mobile terminal can easily identify the icon located in the same layer as the 3D pointer, and wherein the controller is further configured to:
in response to a predetermined gesture when the mobile terminal is a first operation mode, perform the operation associated with the object indicated by the 3D pointer, and
in response to a determination that the indicator has not moved for a predetermined time when the mobile terminal is a second operation mode, perform the operation associated with the object indicated by the 3D pointer.

14. The mobile terminal of claim 13, wherein the indicator is a hand.

15. The mobile terminal of claim 13, wherein the controller changes the position of the displayed 3D pointer based on movement of the indicator.

16. The mobile terminal of claim 13, wherein the controller detects a gesture based on visual data received from the camera, and the controller performs the operation associated with the object indicated by the 3D pointer based on the detected gesture.

17. The mobile terminal of claim 13, wherein the controller determines that the indicator has not moved for a predetermined time based on visual data received from the camera.

18. The mobile terminal of claim 13, wherein the controller generates visual effects to the 3D pointer as the 3D pointer is closer to a specific object.

19. The mobile terminal of claim 13, further comprising a haptic module to generate tactile effects, wherein the controller controls the haptic module to generate tactile effects based on a change of a depth of the 3D pointer.

20. A display method of a mobile terminal, the method comprising:
displaying a three dimensional (3D) image on a display;
displaying a 3D pointer on the 3D image;
receiving data of a user's hand from a camera;
changing the displayed 3D pointer based on the received data of the user's hand;
displaying depth information corresponding to a depth of the 3D pointer in the 3D image while the 3D pointer is moved, and not displaying the depth information in the 3D image while the 3D pointer is stopped;
outputting a vibration pattern corresponding to a new layer each time the 3D pointer reaches the new layer; and
performing an operation associated with an object indicated by the 3D pointer, wherein the performing of the operation includes performing the operation in response to a predetermined gesture when the mobile terminal is a first operation mode, and performing the operation in response to a determination that the hand has not moved for a predetermined time when the mobile terminal is a second operation mode,
wherein the 3D image is divided into a plurality of layers located at different depths and one or more icons are arranged at each layer, and
wherein an icon located in the same layer as the 3D pointer is displayed with a different color or shape than other icons located at other layers such that a user of the mobile terminal can easily identify the icon located in the same layer as the 3D pointer.

21. The method of claim 20, wherein changing the displayed 3D pointer includes changing a position of the displayed 3D pointer based on movement of the hand.

22. The method of claim 20, further comprising:
detecting a gesture based on data received from the camera, wherein performing the operation associated with the object indicated by the 3D pointer includes performing the operation based on the detected gesture.

23. The method of claim 20, further comprising changing a 3D depth of the displayed 3D pointer based on movement of the user's hand.

24. The method of claim 20, wherein the determination that the hand has not moved for the predetermined time is based on data received from the camera.

25. The method of claim 20, further comprising selecting an object on the 3D image using the displayed 3D pointer.

* * * * *